United States Patent
Guendel et al.

(10) Patent No.: US 10,691,980 B1
(45) Date of Patent: Jun. 23, 2020

(54) MULTI-TASK LEARNING FOR CHEST X-RAY ABNORMALITY CLASSIFICATION

(71) Applicant: Siemens Healthcare GmbH, Erlangen (DE)

(72) Inventors: Sebastian Guendel, Erlangen (DE); Florin-Cristian Ghesu, Princeton, NJ (US); Eli Gibson, Plainsboro, NJ (US); Sasa Grbic, Plainsboro, NJ (US); Bogdan Georgescu, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/571,460

(22) Filed: Sep. 16, 2019

Related U.S. Application Data

(60) Provisional application No. 62/835,551, filed on Apr. 18, 2019.

(51) Int. Cl.
| | | |
|---|---|---|
| *G06K 9/00* | (2006.01) | |
| *G06K 9/62* | (2006.01) | |
| *G06T 7/00* | (2017.01) | |
| *G06T 7/70* | (2017.01) | |

(52) U.S. Cl.
CPC .......... *G06K 9/6267* (2013.01); *G06T 7/0012* (2013.01); *G06T 7/70* (2017.01); *G06T 2207/10116* (2013.01); *G06T 2207/20081* (2013.01); *G06T 2207/30048* (2013.01); *G06T 2207/30061* (2013.01)

(58) Field of Classification Search
CPC ....... G06K 9/6267; G06T 7/70; G06T 7/0012; G06T 2207/30061; G06T 2207/10116; G06T 2207/30048; G06T 2207/20081
See application file for complete search history.

(56) References Cited

U.S. PATENT DOCUMENTS

| | | | | |
|---|---|---|---|---|
| 2010/0310183 | A1* | 12/2010 | Kendall | ................. A61B 6/502 382/224 |
| 2018/0247107 | A1* | 8/2018 | Murthy | .............. G06K 9/00147 |

OTHER PUBLICATIONS

Dong, Daxiang et al. "Multi-Task Learning for Multiple Language Translation." ACL(2015).
G. Huang, Z. Liu, K. Q. Weinberger, L van der Maaten. Densely Connected Convolutional Networks.arXiv:1608.06993, 2016.
Huazhe Xu, Yang Gao, Fisher Yu, and Trevor Darrell. End-to-end learning of driving models from large-scalevideo datasets. arXiv preprint, 2017.
Irvin, J., Rajpurkar, et al. Chexpert: A large chest radiograph dataset with uncertainty labels and expert comparison. arXiv preprint arXiv:1901.07031. 2019.

(Continued)

*Primary Examiner* — Dhaval V Patel

(57) ABSTRACT

Systems and methods are provided for automatic classification of multiple abnormalities that are visible in chest X-ray images. The systems and methods are based on a deep learning architecture that predicts, in addition to classification scores of abnormalities, lung/heart masks, and the location of certain abnormalities. By training a multi-task network to improve all the results, the network and the resulting abnormality classification is improved. Normalization of the chest X-ray images is also used to improve the accuracy and efficiency of the multi-task network.

18 Claims, 8 Drawing Sheets

(56) References Cited

OTHER PUBLICATIONS

L. Oakden-Rayner, "Exploring the chestxray14 dataset: problems," https://lukeoakdenrayner.wordpress.com/2017/12/18/the-chestxray14-dataset-problems/, accessed: Dec. 18, 2017.

P. Rajpurkar, J. Irvin, K. Zhu, B. Yang, H. Mehta, T. Duan, D. Ding, A. Bagul, C. Langlotz, K. Shpanskaya et al., "Chexnet: Radiologist level pneumonia detection on chest x-rays with deep learning," arXiv:1711.05225, 2017.

P. Rajpurkar, "Deep learning for chest radiograph diagnosis: A retrospectivecomparison of the chexnext algorithm to practicing radiologists," PLOS Medicine, vol. 15, No. 11, pp. 1-17, 112018. [Online]. Available: https://doi.org/10.1371/journal.pmed.1002686.

Q. Guan, Y. Huang, Z. Zhong, Z. Zheng, L. Zheng, and Y. Yang, "Diagnose like a Radiologist: Attention GuidedConvolutional Neural Network for Thorax Disease Classification," ArXiv e-prints, Jan. 2016.

R. H. H. M. Philipsen, P. Maduskar, L. Hogeweg, J. Melendez, C. I. Sanchez, and B. van Ginneken, "Localizedenergy-based normalization of medical images: Application to chest radiography," IEEE Transactions on MedicalImaging, vol. 34, pp. 1965-1975, 2015.

S. Dippel, M. Stahl, R. Wiemker, and T. Blaffert, "Multiscale contrast enhancement for radiographies: Laplacianpyramid versus fast wavelet transform," IEEE Transactions on Medical Imaging, vol. 21, No. 4, pp. 343-353, Apr. 2002.

X. Wang, Y. Peng, L. Lu, Z. Lu, M. Bagheri, and R. Summers, "Chestxray8: Hospital-scale chest x-ray database and benchmarks on weakly supervised classification and localization of common thorax diseases," in Proc. CVPR, 2017, pp. 3462-3471.

X. Yin and X. Liu, "Multi-Task Convolutional Neural Network for Pose-Invariant Face Recognition," in IEEETransactions on Image Processing, vol. 27, No. 2, pp. 964-975, Feb. 2018.

\* cited by examiner

MULTI-TASK LEARNING FOR CHEST X-RAY ABNORMALITY CLASSIFICATION

CROSS REFERENCE TO RELATED APPLICATIONS

This application claims the benefit of U.S. Provisional Application No. 62/835,551 filed Apr. 18, 2019, which is hereby incorporated by reference in its entirety and relied upon.

FIELD

The present embodiments relate to medical imaging processing.

BACKGROUND

Chest radiography is one of the most common imaging examinations. Chest radiography is used for screening, diagnosis, and management of many life-threatening diseases. Reading and diagnosing chest X-ray images may require careful observation and knowledge of anatomical principles, physiology, and pathology. Such factors increase the difficulty of developing a consistent and automated technique for reading chest X-ray images.

Advancements in machine learning-based systems and large datasets have enabled algorithms to match the performance of medical professionals in a wide variety of medical imaging tasks. However, automated diagnosis of chest X-rays is difficult as analysis requires an approach that can detect multiple pathologies simultaneously. Automated chest X-ray interpretation at the level of medical professionals could provide substantial benefits in many medical settings, from improved workflow prioritization and clinical decision support to large-scale screening and global population health initiatives. Only recently has the computational power and availability of large datasets allowed for the development of such an approach.

Developing the systems is challenging due to several factors including, but not limited to, high inter-rater variability in interpretation, high error rates in annotations due to the methods of annotation and inherent ambiguity in pathology appearance, limited data availability, lack of image quality, and site-specific image characteristics. The factors, in the context of machine learning-based systems, lead to overconfident systems with poor generalization on unseen data.

SUMMARY

By way of introduction, the preferred embodiments described below include embodiments for a multi-task network that is configured for the classification of different abnormalities. Embodiments provide machine-learning methods that improve the generalization of detection and classification in the context of chest radiography.

In a first aspect, a system is provided for multi-abnormality classification based on chest X-ray images. The system includes an imaging database, a normalization module, a multi-task network, and a confidence module. The imaging database is configured to store X-ray images. The normalization module is configured to process X-ray images to remove image characteristics variability due to acquisition factors. The multi-task network is configured to input a chest X-ray image and output abnormality classification scores for a plurality of abnormalities. The confidence module is configured to map the abnormality classification scores to discrete classification as a function of a learned score threshold and a discrete confidence category.

In an embodiment, the system further includes an imaging system configured to acquire chest X-ray images.

In an embodiment, the normalization module is configured to adjust brightness and contrast via a linear transformation of image intensities of the chest X-ray images.

In an embodiment, the multi-task network comprises an encoder network and a decoder network. The encoder network may comprise a plurality of layers of densely connected blocks followed by a global average pooling layer to predict the abnormality classification scores for the chest X-ray image. The decoder network may comprise up-sampling, convolutional, and nonlinear layers and may be configured to generate predicted segmented masks of anatomical structures for the chest X-ray image. A global loss value may be used for optimizing the internal parameters of the multi-task network. The global loss value may be calculated as a combination of an abnormality classification loss value, a segmentation loss value, and a spatial location loss value.

In an embodiment, the learned score threshold is calculated as a function of a multi-user observer study to yield a 1:1 ratio of false positives and false negatives.

In an embodiment, the confidence module is configured to map the abnormality classification scores as a function of a multi-user observer study to span a range such that a ratio of correct to incorrect classifications for each abnormality reaches a prespecified value.

In an embodiment, the system further includes an analysis module configured to recommend a procedure as a function of the discrete classifications.

In a second aspect, a method is provided for training a multi-task network for the classification of different abnormalities, classification of locations of the abnormalities, and segmentation of lungs and heart. Training data is acquired that comprises a plurality of chest X-ray images and annotations. The chest X-ray images are normalized to remove image characteristic variability due to acquisition factors. The normalized chest X-ray images are input into the multi-task network. Abnormality classification scores, spatial classification scores, and a segmented mask are output from the multi-task network. The abnormality classification scores, the spatial classification scores, and the segmented mask are compared against a ground truth metric from the training data. Weights in the multi-task network are adjusted as a function of the comparison. The steps of inputting, outputting, comparing, and adjusting are repeated for a predetermined number of iterations and a trained multi-task network is output.

In an embodiment, the normalizing comprises adjusting a brightness and contrast of the chest X-ray images via a linear transformation of image intensities of the chest X-ray images.

In an embodiment, the multi-task network comprises an encoder decoder network.

In an embodiment, the encoder network comprises a plurality of layers of densely connected blocks followed by a global average pooling layer to predict the abnormality classification scores for the chest X-ray image. The decoder network may comprise up-sampling, convolutional, and nonlinear layers and may be configured to generate predicted segmented masks of anatomical structures for the chest X-ray image.

In an embodiment, comparing comprises calculating a global loss value as a combination of an abnormality classification loss value and a segmentation loss value.

In a third aspect, a non-transitory computer implemented storage medium is provided, including machine-readable instructions stored therein, that when executed by at least one processor, cause the processor to acquire a chest X-ray image of a patient, normalize the chest X-ray image, input the normalized chest X-ray image into a machine learnt network optimized to identify abnormalities in chest X-ray images, receive, from the machine learnt network, one or more abnormality classification scores for the chest X-ray image, map each of the abnormality classification scores to a discrete classification of abnormalities, and output the discrete classifications of abnormalities.

In an embodiment, the instructions when executed by at least one processor, cause the processor to recommend a medical procedure as a function of the discrete classification of abnormalities.

In an embodiment, the machine-readable instructions to normalize the chest X-ray image comprise instructions to adjust brightness and contrast via a linear transformation of image intensities of the chest X-ray image.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

Figure 1:
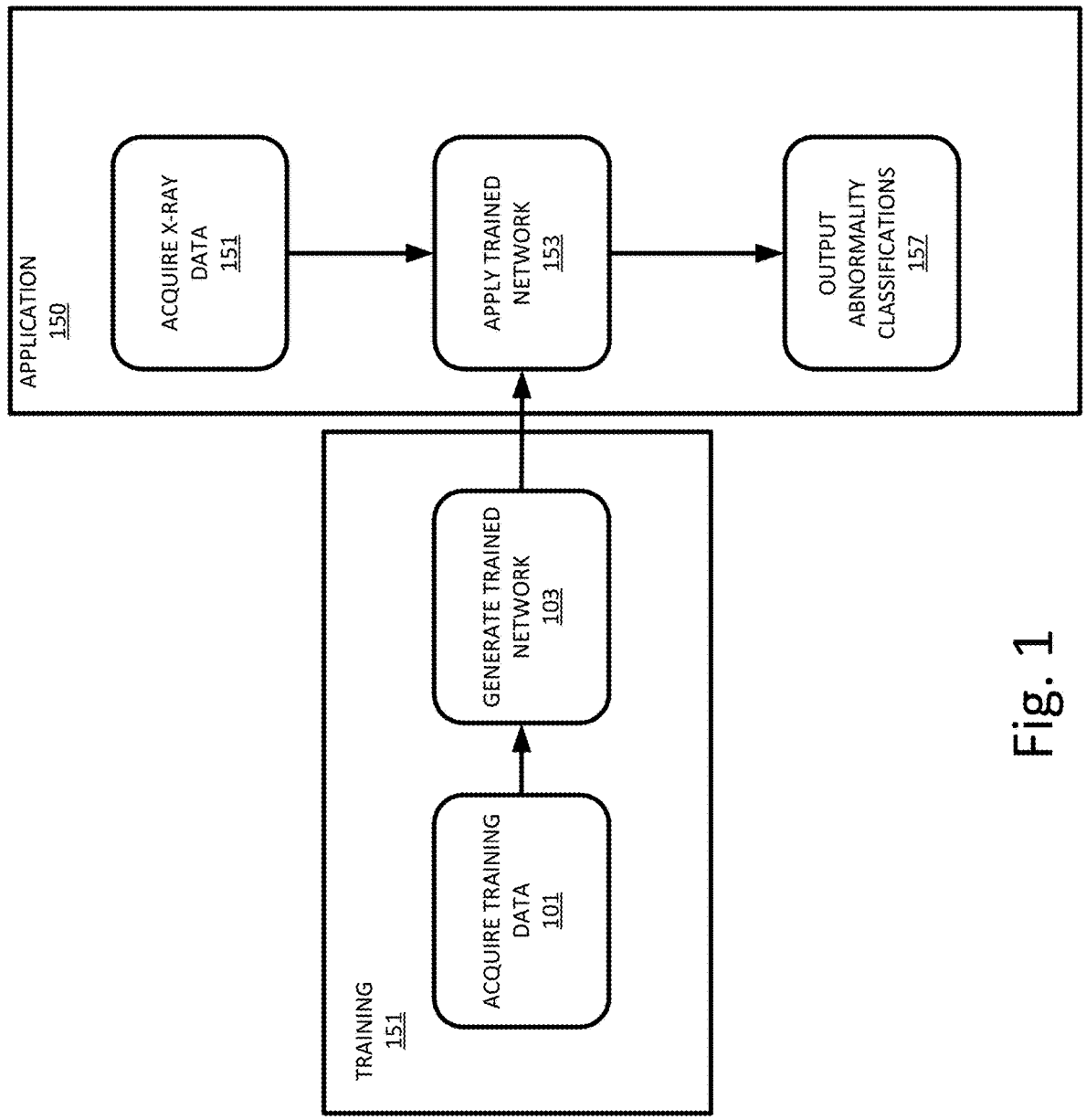
FIG. 1 depicts an example flowchart for training and applying a multi-task network for classifying abnormalities in chest radiography.

Embodiments increase the accuracy of machine learning systems with advanced normalization and a network architecture that utilizes multitask learning. Embodiments include three stages. A normalization component processes X-ray images to remove image characteristic variability (e.g. image brightness and contrasts) due to acquisition factors (imaging device or radiation dose) or post-processing steps. A multitask network architecture is configured to generate an abnormality prediction and multiple secondary outputs. A confidence component is configured to characterize the confidence of the prediction. Used together, the three stages provide an improvement in the performance of abnormality detection and classification in chest X-ray images.

Chest radiograph interpretation is critical for the detection of different thoracic diseases, including tuberculosis and lung cancer, that affect millions of people each year. Interpretation is a time-consuming task that requires expert radiologists to read the images. Fatigue-based diagnostic error and lack of diagnostic expertise in areas of the world where radiologists are not available may result. Different solutions have been tried, but the solutions have resulted in overconfident automated systems with poor generalization on unseen data.

Embodiments described herein provide for the automatic classification of multiple abnormalities that are visible in chest X-ray images. The systems and methods are based on a deep learning architecture that predicts, in addition to classification scores of abnormalities, lung/heart masks and the location of certain abnormalities. By training the multi-task network to improve all the results, the network and the resulting abnormality classification is improved.

The improved multi-task network also increases the performance and generalizability of the detection and classification system. One performance improvement is achieved by the normalization component that removes inter-site variation while another improvement is achieved by the multi-task learning that preserves information that is semantically meaningful such as the lung/heart masks and the location of certain abnormalities. The systems and methods may also be implemented in less time due to the normalization. The normalization simplifies the mapping that the detection and classification needs to learn by removing inter-site variation in image characteristics. The network is also improved due to the simultaneous generation of classification confidence scores.

As implemented, the confidence component also provides increased efficiency for organizations incorporating the multi-task network by distinguishing ambiguous cases that need expert intervention from those that might be automatically processed or interpreted by less skilled interpreters. The improved network also increases the value of applications that depend on the improved classification and confidence by enabling features that treat certain and uncertain findings differently, and potentially enabling operational efficiencies for certain applications.

The technical improvements are provided by the configuration of the network and/or the learning mechanisms used to train the network. A baseline classification network is augmented and improved by incorporating into the multi-task network the prediction of spatial knowledge. Applying gaussian smoothing and median filtering over the image intensities normalizes all images prior to the network training. The uncertainty band categorizes the network output prediction into discrete confidence classes.

In the examples described below, a chest X-ray image is used as the image data. The multi-task network is therefore also trained and optimized using a dataset of annotated chest X-ray images. Other types of image data may be used. In the described embodiments, certain machine learning techniques are also used to optimize the internal parameters of the multi-task network to both predict/classify abnormalities and to generate the abnormality location and anatomical segmentations. Different machine learning techniques may be used with either chest X-ray images or other types of image data.

FIG. 1 depicts an example flowchart for automatic classification of multiple abnormalities that may be visible in chest X-ray images. The flowchart includes two stages, a training stage 151 for generating or training the multi-task network using a collection of training data (labeled data) and an application stage 150 for applying the generated/trained multi-task network to new unseen (unlabeled) data. The training stage 151 includes acquiring 101 training data and inputting the training data into a multi-task network in order to generate 103 a trained multi-task network. The output is a trained multi-task network that is applied 153 in the application stage 150. The application stage 150 includes acquiring 151 unseen chest X-ray data, applying 153 the trained multi-task network that was trained during the training stage 151 to the unseen chest X-ray data, and outputting 157 abnormality classifications.

The training stage 151 may be performed at any point prior to the application stage 150. The training stage 151 may be repeated after new training data is acquired. The application stage 150 may be performed at any point after the training stage 151 generates the trained multi-task network and chest X-ray data is acquired. The application stage 150 may be performed, for example, during (e.g. real time) or directly after a medical procedure is performed or as part of planning for a patient. Alternatively, the application stage 150 may be performed at a later point using chest X-ray data acquired from an imaging scan and stored, for example, in a PACS.

Figure 2:
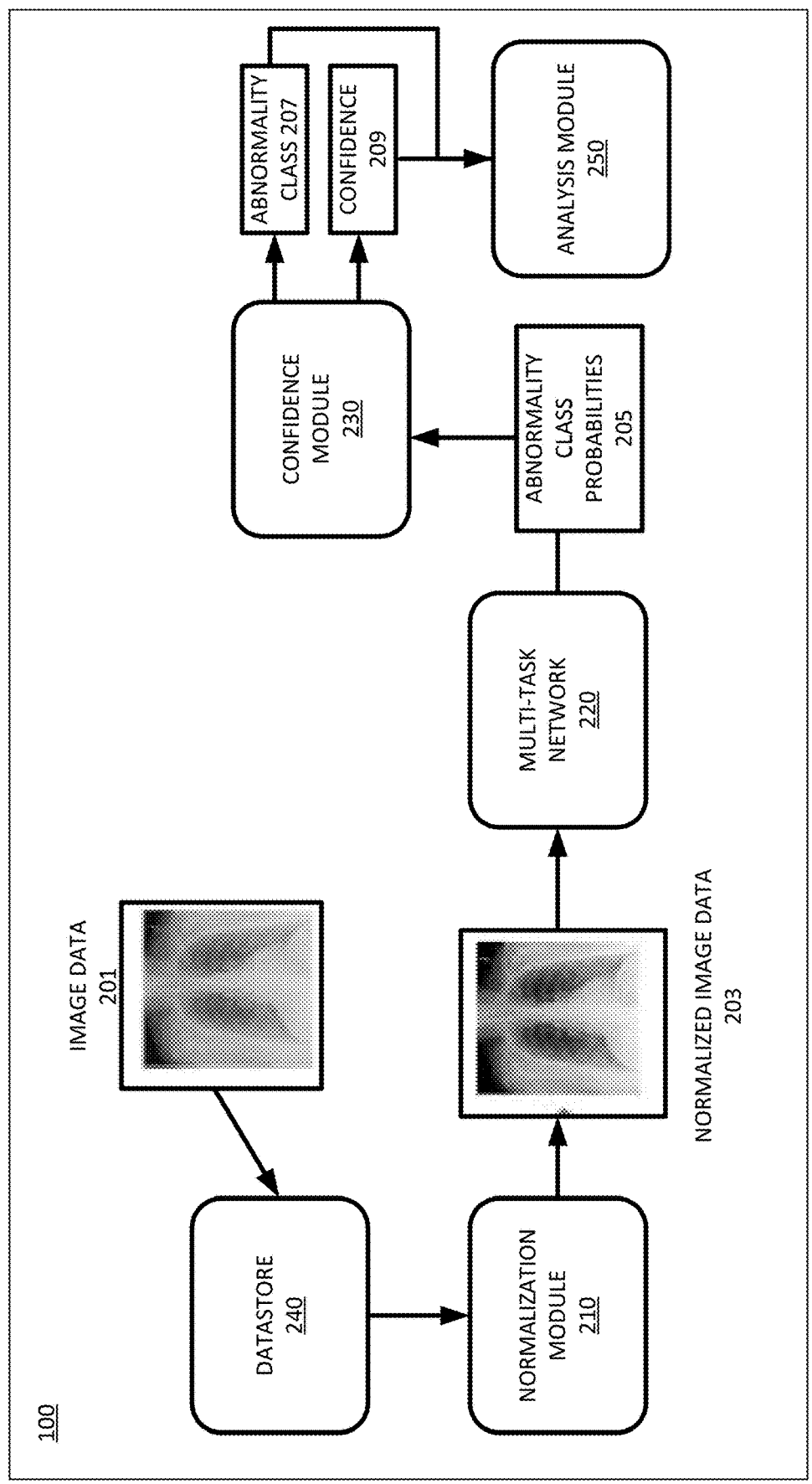
FIG. 2 depicts an example system for applying a multi-task network for classifying abnormalities in chest radiography.

FIG. 2 depicts a system 100 for the training 151 and application 150 of a multi-task network for classification of different abnormalities based on chest X-ray scans of a patient. The system is based on a multi-task deep learning architecture that in addition to the abnormality classification, supports the segmentation of the lungs and heart and classification of regions where the abnormality is located. The system includes a datastore 240, a normalization module 210, a multi-task network 220, and a confidence module 230. The system may include other components or devices such as an imaging device that is configured to acquire image data such as chest X-ray image data and store the image data in the datastore 240. The system may also include user interface components such as a display or graphical user interface that a user may use to interact with the system. Image data 201 is stored in the datastore 240. The image data 201 is input into the normalization module 210 that outputs normalized image data 203. The normalized image data 203 is input into the multi-task network 220 which outputs abnormality class probabilities 205. The abnormality class probabilities 205 are input into the confidence module 230 which outputs abnormality classes 207 with a discrete confidence range 209.

The system 100 includes a datastore 240 that is configured to store image data 201 relating to medical images. During training 151 of the multi-task network 220, the datastore 240 may store hundreds, thousands, or more annotated (e.g. ground truth) medical images. Annotated images may include information relating to any abnormalities present, the spatial location of the abnormalities, and ground truth masks of the anatomy (e.g. the heart and/or lungs). During application 150, the system 100 may include an imaging device that is configured to acquire one or more images from an object or patient and store the one or more images as image data 201 in the datastore 240 for processing by the system 100. In an embodiment, the imaging device is a chest X-ray imaging device, and the image data 201 is chest X-ray image data.

The image data 201 is data representing a two-dimensional image or a three-dimensional volume of the object or patient. The data may be in any format. While the terms image and imaging are used, the image or imaging data may be in a format prior to actual display of the image. For example, the imaging data may be a plurality of scalar values representing different locations in a Cartesian or polar coordinate format different than a display format. As another example, the imaging data may include a plurality of shades of grey values output to a display for generating the image in the display format. The imaging data is a dataset that may be used for imaging, such as scan data or a generated image representing the patient.

An imaging device used for acquiring chest X-rays may include a wall-mounted, box-like apparatus that contains X-ray film or a special plate that records the image digitally. An X-ray producing tube is positioned opposite the detector relative to the patient. The imaging device may also be arranged with the X-ray tube suspended over a table on which the object or patient lies. A drawer under the table holds the X-ray film or digital recording plate. Other types of imaging devices may be used such as portable devices. A portable X-ray device is a compact apparatus that may be taken to the patient. The X-ray tube is connected to a flexible arm that is extended over the patient while an X-ray film holder or image recording plate is placed beneath the patient.

The X-ray imaging device is operative to produce X-rays and send the X-rays through a patient or object. The X-ray imaging device is aimed at the part of the patient being examined and the X-ray imaging device produces a small burst of radiation that passes through the patient, recording an image on photographic film or a special digital detector. Different parts of the patient absorb the X-rays in varying degrees. Dense bone absorbs much of the radiation while soft tissue, such as muscle, fat, and organs, allow more of the X-rays to pass through them. As a result, bones appear white on the X-ray, soft tissue shows up in shades of gray and air appears black. On a chest X-ray, the ribs and spine will absorb much of the radiation and appear white or light gray on the image. Lung tissue absorbs little radiation and will appear dark on the image. X-ray images may be stored electronically as digital files. The stored images are then accessible for analysis, diagnosis, and disease management.

The imaging data represents tissue and/or bone structure of the patient. For imaging the chest, the imaging data may include a response from the lungs, heart, and the anatomy around the lungs (e.g., upper torso). In other embodiments, the medical image represents both function (such as perfusion), such as nuclear medicine (NM) data, as well as structure. The chest X-ray may be an anterior-posterior (AP) or posterior-anterior (PA) chest X-ray image with size N×N. The chest X-ray image may be resized to a standard size. The chest X-ray may include no, one, or more abnormalities such as granuloma, infiltrate, nodule, scaring, effusion, atelectasis, bone/soft tissue lesion, fibrosis, cardiac abnormality, mass, pneumothorax, COPD, consolidation, pleural thickening, cardiomegaly, emphysema, edema, pneumonia, hilar abnormality, or hernias among other abnormalities. Different anomalies or abnormalities may be included and detected in the imaging data.

The system 100 includes a normalization module 210 that is configured to adjust the brightness and contrast of the chest X-ray images via a linear transformation of the image intensities. A series of image processing steps (e.g., a pixel value histogram, Gaussian smoothing, and/or median filtering) are applied to identify image intensity levels that are robust to image noise, artifacts, and overlays. The levels are used to normalize the image intensities from 0 to 1. The normalization may use windowing to adjust the levels. Windowing is the process of selecting some segment of the total value range and then displaying the values within that segment over the full range. In a simple example, an image ranges from full white to full black over a range of 1 to 100 using different shades of grey. If the windowing is set to 1 to 25, then the image is rendered with shades of full white to full black over just 1 to 25 instead of from 1 to 100. Anything in the original image over 25 is rendered black.

Figure 3:
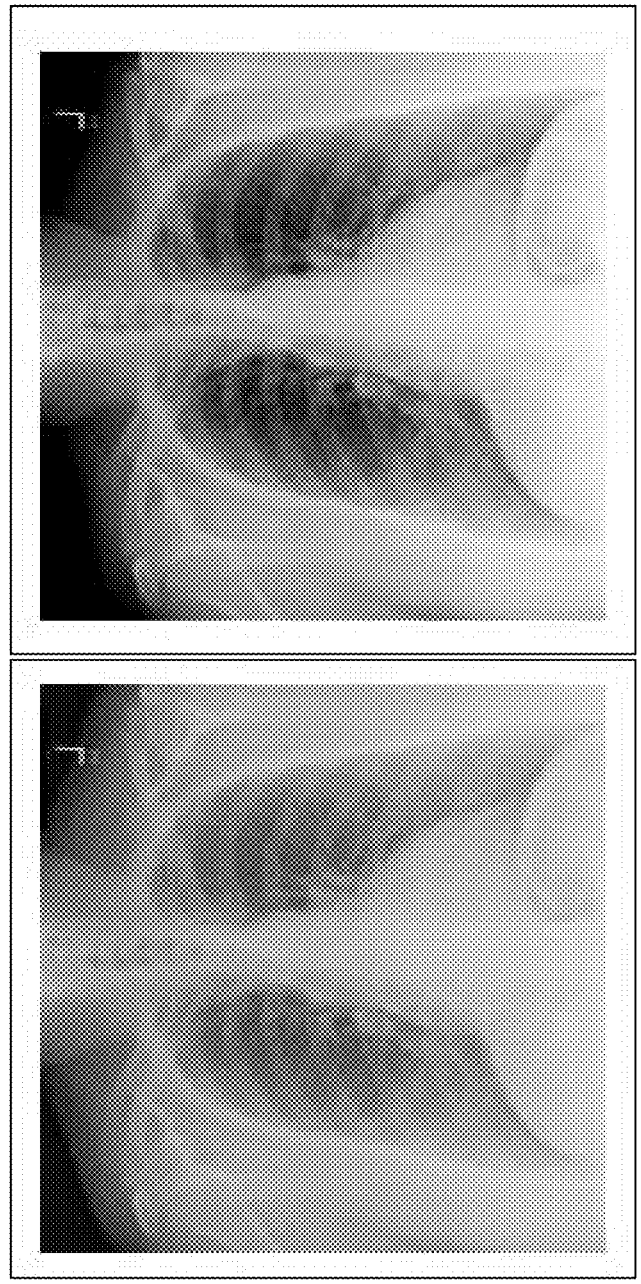
FIGS. 3A and 3B depict an example image before and after normalization.

In an embodiment, an arbitrary anterior-posterior (AP) or posterior-anterior (PA) chest X-ray image I with size N×N that was stored in the datastore 240 and/or acquired by the imaging device is input into the normalization module 210. A pixel value histogram is calculated for the image I as h (x; I). Using Gaussian smoothing and median filtering, the noise of the histogram h (visible as, e.g., signal spikes due to black background or white text overlay) is reduced. Two bounds Blow, and Bhigh are calculated for the histogram h that represent a tight intensity window for the chest X-ray image I. The normalization is thus applied as follows, I=(I−Blow)/(Bhigh−Blow). FIGS. 3A and 3B depict examples of an image before and after normalization respectively. The image depicted in 3A includes additional noise and it is more difficult to visually identify abnormalities in the image. After normalization, the image in 3B is cleaner and it is easier to identify abnormalities in the image.

The system 100 includes a multi-task network 220 that is optimized/trained to input the normalized image and output classifications and probabilities of different abnormalities present in the image. In an embodiment, the multi-task network 220 includes an encoder network and a decoder network. The normalized image is input into the encoder network. The output of the encoder network includes at least an abnormality classification for each abnormality identified in the input normalized image. An output of the encoder network is also used as an input to the decoder network. The output of the decoder network is a segmented image which may or not be shown to a user. During application 150, the encoder is used as a classification network which outputs the abnormality classification. The decoder network may not be used during application 150 of the multi-task network 220, but rather only used during training 151.

The multi-task network 220 is defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower level features (i.e., features at a more abstract or compressed level). For example, features for reconstructing an image are learned. For a next unit, features for reconstructing the features of the previous unit are learned, providing more abstraction. Each node of the unit represents a feature. Different units are provided for learning different features.

Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes. In general, for convolution, subsequent units have more abstraction. For example, the first unit provides features from the image, such as one node or feature being a line found in the image. The next unit combines lines, so that one of the nodes is a corner. The next unit may combine features (e.g., the corner and length of lines) from a previous unit so that the node provides a shape indication. For transposed convolution to reconstruct, the level of abstraction reverses. Each unit or layer reduces the level of abstraction or compression.

Figure 4:
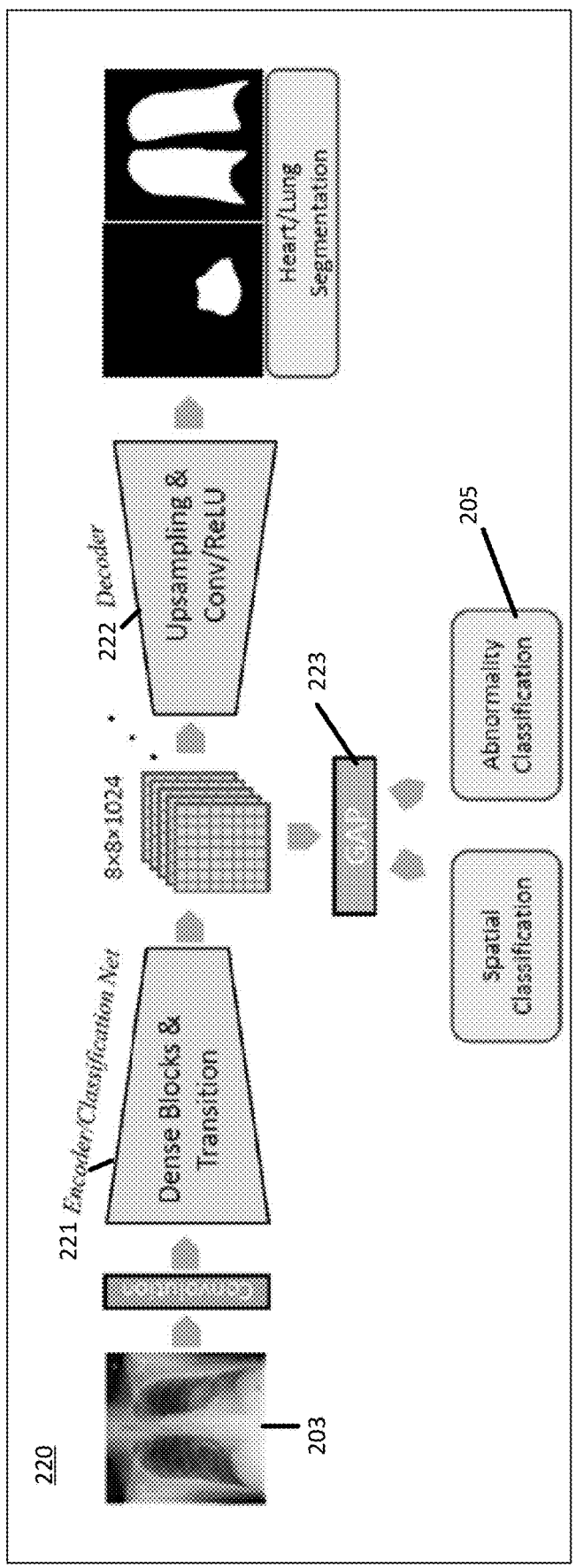
FIG. 4 depicts an example multi-task network for classifying abnormalities.

FIG. 4 depicts an example of a multi-task network 220 used to classify abnormalities in chest X-ray images. The multi-task network 220 includes a convolution layer that inputs a normalized image. The convolution layer feeds into an encoder network 221. The encoder network 221 feeds bottleneck features into the decoder 222 and a global average pooling (GAP) layer 223. The output of the GAP 223 is a spatial classification used during training 151 and an abnormality classification used during training 151 and application 150. The decoder 222 outputs a segmented mask that is used during training 151 and may be used during application 150.

The encoder 221 of the multi-task network 220 may use a DenseNet architecture. A DenseNet connects each layer in a network to every other layer in a feed-forward fashion. For each layer in the DenseNet, the feature-maps of all preceding layers are used as inputs, and the output feature-map of that layer is used as input into all subsequent layers. In the DenseNet, for each layer, the feature maps of all preceding layers are used as inputs, and its own feature maps are used as inputs into all subsequent layers. To reduce the size of the network, the DenseNet may include transition layers. The layers include convolution followed by average pooling. The transition layers reduce height and width dimensions but leave the feature dimension the same.

In an embodiment, the network architecture of the encoder 221 includes five dense blocks and a total of 121 convolutional layers. Each dense block includes several dense layers that include batch normalization, rectified linear units, and convolution. Between each dense block, a transition layer is added, that includes batch normalization, convolution, and pooling, to reduce the dimensions.

The global average pooling layer 223 may be resized depending on the input size. The number of output units is set to the number of abnormality classes D. For the example of detecting abnormalities in a chest X-ray the classes may include granuloma, infiltrate, nodule, scaring, effusion, atelectasis, bone/soft tissue lesion, fibrosis, cardiac abnormality, mass, pneumothorax, COPD, consolidation, pleural thickening, cardiomegaly, emphysema, edema, pneumonia, hilar abnormality, hernia, among other abnormalities. Depending on the data used to optimize the multi-stage network, more or fewer abnormalities may be classified. For different types of image data (e.g. other than chest X-ray image data) alternative classifications may be used. The output of the GAP 223 is input into a sigmoid activation functions for each class to map the output to a probability interval [0, 1].

The decoder network 222 inputs the features maps of the last dense block of the encoder network 221 and outputs predicted segmented masks for the normalized X-ray image. In this way, the additional knowledge about the shape of the anatomy in the X-ray image is integrated in an implicit way, i.e., during the training 151 of the multi-task network 220. The encoder network 221 learns features that are not only relevant for the abnormality classification, but also for the isolation/segmentation of the relevant image regions.

Figure 5:
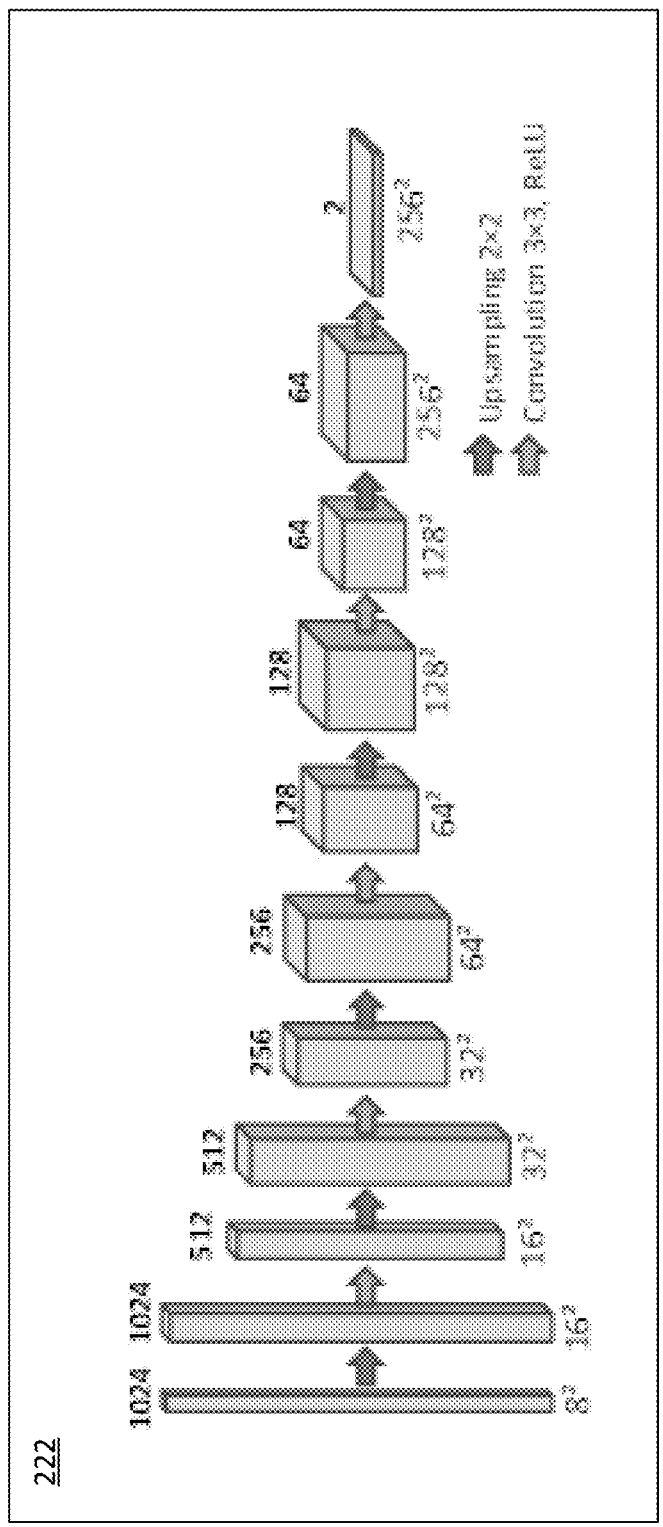
FIG. 5 depicts an example decoder network of the multi-task network of FIG. 4.

FIG. 5 depicts an example decoder network 222 for use in the multi-task network 220. The decoder network 222 includes up sampling, convolutional layers, an ReLUs to generate feature layers of increasing resolution and decreasing feature count culminating in predicting lung and heart segmentations at the original input image resolution or another resolution.

To optimize the multi-task network 220, ground truth annotations (e.g., classification, spatial location, and/or segmentation) and data is used. The training process 151 is described below in FIG. 7. The ground truth segmentation quality labels may be manually generated or automatically generated using different techniques. The unlabeled training data is normalized and input into the multi-task network 220. The multi-task network 220 generates outcomes that are compared against associated labeled training data. Using backpropagation and a gradient, the multi-task network 220 adjusts internal parameters based on the comparison. The loss function for the gradient may be calculated as a function of a loss value for each of the abnormality classifications, spatial classifications, and the segmented masks. The process is repeated until the multi-task network 220 may no longer be improved or a set point is reached.

Alternative deep architectures may be used for the multi-task network 220 such as CNN, deep belief nets (DBN), or other deep networks. CNN learns feed-forward mapping functions while DBN learns a generative model of data. In addition, CNN uses shared weights for all local regions while DBN is a fully connected network (e.g., including different weights for all regions of an image). The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

In an embodiment, the multi-task network 220 is configured to input the normalized chest X-ray image and output a probability of different abnormalities present in the chest X-ray image: $\underline{o}=p(I; \theta)$, where $\underline{o} \in [0, 1]^D$ and D is the number of considered abnormalities. The multi-task network 220 is also configured to compute a probabilistic segmentation map $S \in [0, 1]^{2 \times N \times N}$ for both lungs and the heart. The probability of different abnormalities is input into the confidence module 230 that generates an abnormality prediction and confidence value.

Referring back to FIG. 1, the system 100 further includes a confidence module 230 that is configured to map the abnormality classification scores as a function of a multi-user observer study to span a range such that a ratio of correct to incorrect classifications reaches a prespecified value. The confidence module 230 generates an abnormality prediction and confidence value which may be provided to a user or operator or used for further analysis.

The confidence module 230 defines a band of probabilities from a validation set of the ground truth data. The band separates confidently true negatives, uncertain algorithm findings, and confidently true positives on unseen data. Based on annotations by multiple radiologists, confidences are defined for each class in each image. In an embodiment, four different confidence categories are used, although more or fewer categories may be identified. The categories used may include, for example, high negative, low negative, high positive, and low positive. The confidence value for the classes and images depends on the number of positive label annotations of the three radiologists. In an embodiment, where three radiologists were polled, an abnormality class is classified as low positive confidence is derived from two readers reporting an abnormality where one reader reported no finding. An abnormality class is classified as low negative when one reader reports an abnormality and two readers report no finding. An abnormality class is classified as high negative when no readers report an abnormality and classified as high positive when three readers report an abnormality. More than three radiologists or readers may be used to complete the study. Different ratios of negative and positive readings may be used.

Figure 6:
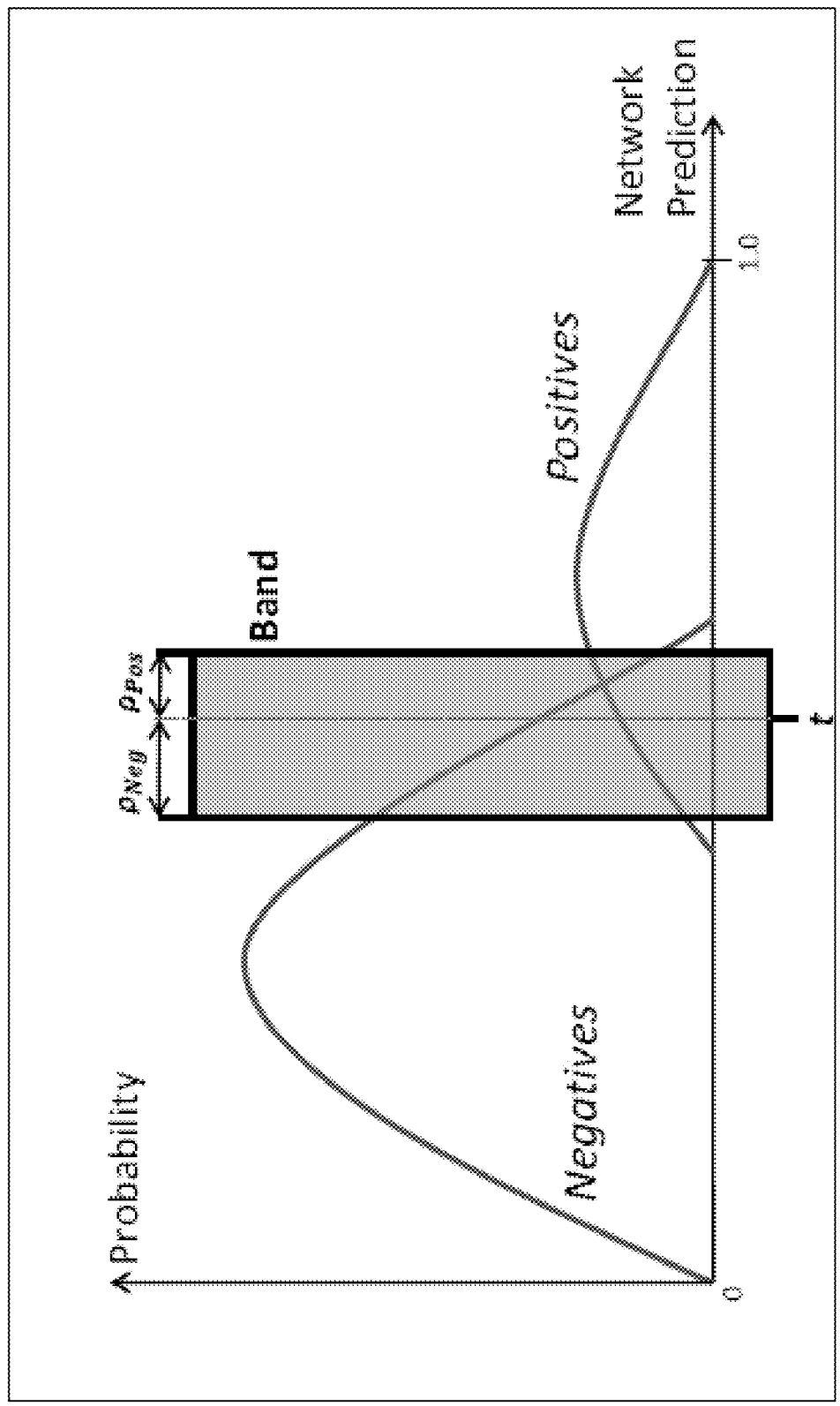
FIG. 6 depicts an example confidence band for classifying abnormalities.

The confidence module 230 may calculate the band based on an AUC (area under a receiver operating characteristic curve) score. AUC provides an aggregate measure of performance across all possible classification thresholds. The band is defined using a threshold and a band width in order to shift the band over the positive and negative distribution of the network prediction. Low confident cases may be located within the band and be misclassified. All samples included in the band may be eliminated. The AUC performance is improved after removing cases within the band. For most abnormalities most cases included within the band are low confidence cases and thus may be eliminated. The threshold is set such that there are equal false positive and false negative ratios for each abnormality. The band width is parametrized to allow a limited number of true positives and false positives within the band. The parameters are found on the validation set, the evaluation is on the test set based on majority vote of the 3 readers. FIG. 6 depicts an example of a graph including a confidence band. The probability is graphed against the network prediction. The band contains almost all false positive and false negative cases. After elimination of cases within the band, a significant performance gain can be achieved when disregarding the cases. After removing the cases within the band, the number of eliminated cases are analyzed with respect to the four defined confidence classes.

The confidence module 230 may be configured to input the abnormality classification scores from the multi-task network 220 and output discrete abnormality classifications reflective of a confidence of the classification. The system may further include a user interface and/or a display. The output of the system may be provided to the user interface or the display. The output, e.g. the abnormality classifications may be stored or provided for further analysis. Scores for the abnormalities as well as the discrete classification/confidence level may be output.

The system 100 may include an analysis module 250 that is configured to automatically recommend a procedure based on the abnormality classification and confidence. For example, certain abnormalities may indicate heart failure, fluid around the heart, cancer, pneumonia, or another condition. If, for example, there is a high confidence level that an abnormality is present, the analysis module 250 may automatically schedule a follow up visit and track a patient's progress.

Figure 7:
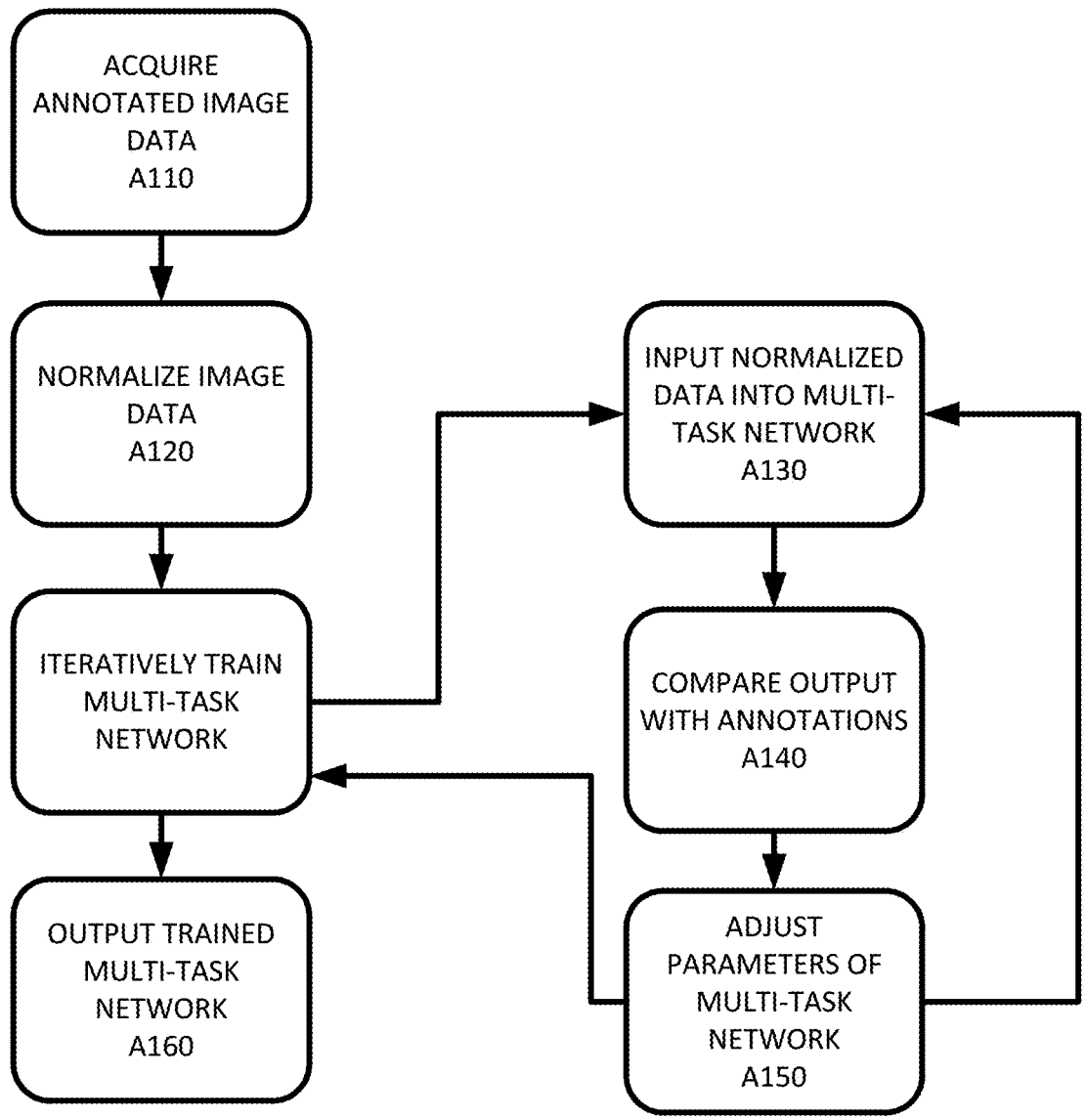
FIG. 7 depicts an example flowchart for training a multi-task network to classify abnormalities.

FIG. 7 depicts a workflow for training 151 a multi-task network 220 to classify abnormalities in medical imaging data. The acts are performed by the system of FIGS. 1, 2, 4, 5, other systems, a workstation, a computer, and/or a server. Additional, different, or fewer acts may be provided. The acts are performed in the order shown (e.g., top to bottom)

or other orders. Certain acts may be omitted or changed depending on the results of the previous acts and the status of the patient.

At act A110, a plurality of annotated image data is acquired. To train the network, ground truth labels are used. The ground truth labels may be manually generated or automatically generated using different techniques. In an embodiment, publicly available data collections may be used such as the ChestX-ray14 (NIH) and PLCO dataset. Ground truth labels may be added as needed. The datasets differ in several aspects. Each data collection may include different types of data including different information. For example, the PLCO dataset includes spatial information for some abnormality classes while the ChestX-ray14 does not. In some data collections, due to follow-up scans, there are multiple images per patient. Patient-wise splits may be used to separate the patients into training, validation, and test sets. Images in the data collection may include multiple abnormalities. Some images may include no abnormalities.

At act A120, the image data is normalized. In an example, the brightness and contrast of the images is adjusted via a linear transformation of the image intensities. A series of image processing steps (e.g., a pixel value histogram, Gaussian smoothing, and median filtering) are applied to identify image intensity levels that are robust to image noise, artifacts, and overlays. The levels are used to normalize the image intensities from 0 to 1. In an embodiment, alternative normalization techniques may be used.

At act A130, unlabeled image data is input into the multi-task network 220. The multi-task network 220 is configured to output an abnormality classification for each detected abnormality, a spatial location, and a segmentation mask. The multi-task network 220 is iteratively optimized using the plurality of annotated image data. The unlabeled training data is input one image at a time (or in batches) into the multi-task network 220. At act A140, the multi-task network 220 generates an outcome that is compared against associated labeled training data. Using backpropagation and a gradient, at act A150, the multi-task network 220 adjusts internal parameters based on the comparison. Acts A130-A150 are repeated until the network may no longer be improved or a set point is reached. The set point may be defined by the number of iterations or a time component.

At act A140, the abnormality classifications, spatial locations, and segmentation mask are compared to ground truth data included with the annotated image data. In an embodiment, the multi-task network 220 is batch trained with 128 samples in each batch. A loss function may be used that measures how accurate the multi-task network 220 is at classifying abnormalities. An Adam optimizer (or other adaptive learning rate optimization algorithm) may be used with an adaptive learning rate. The learning rate is initialized with 10-3 and reduced by a factor of 10 when the validation loss plateaus. In an embodiment, the loss function is calculated as a combination of a loss value for each detected abnormality, a spatial location, and a segmentation mask, for example, as:

$$L_{Glob} = L_{Abn} + L_{Seg} + L_{Loc}.$$

where Lglob is the global loss, Labn is the loss for the abnormality classification, Lseg is the loss for the segmentation and Lloc is the loss for the spatial location. Weights may be used to weight one or more losses relative to other losses. For the abnormality loss, in an embodiment, the training process is modified such that each class of abnormality may be trained individually. There are, as such, D binary cross-entropy loss functions. Corresponding labels [c1, c2 . . . cD]∈{0, 1} (absence or presence of the abnormality, respectively) from the annotated training data are compared with the output and the loss is measured. Additional weight constants may be added to the cross-entropy function using the following equations:

$$\mathcal{L}_{Abn}^{(n)}(I, c_n) = -(w_P^{(n)} * c_n \log(p_n) + w_N^{(n)} * (1 - c_n)\log(1 - p_n)),$$

$$\mathcal{L}_{ABN} = \sum_{n=1}^{D} \mathcal{L}_{Abn}^{(n)}(I, c_n),$$

where $$w_P^{(n)} = \frac{P_n + N_n}{P_n}$$

and $$w_N^{(n)} = \frac{P_n + N_n}{N_n},$$

with Pn and Nn indicating the number of cases where the abnormality indexed by n is present, present, respectively missing from the training.

For the segmentation loss, in an embodiment, the multi-task network 220 is also trained to generate segmentation masks that are compared to the ground truth data. The image information outside of the regions may be regarded as irrelevant for the diagnosis of certain lung/heart abnormalities. Instead of providing the predicted masks as input for the encoder 221, the encoder 221 is extended with a decoder branch that is configured to predict the masks. In this way, the additional knowledge about the shape of the heart and lung lobes is integrated in an implicit way, i.e., during the training process through the flow of gradients used to adjust the multi-task network 220. As such, in the encoder part, the multi-task network 220 learns features that are not only relevant for the abnormality classification, but also for the isolation/segmentation of the relevant image regions. The decoder architecture is described above in FIG. 5. For the segmentation task, a mean squared error loss function may be used as follows:

$$\mathcal{L}_{Seg}(I, s) = \frac{1}{t}\sum_{i=1}^{t}(s_i - p_i)^2,$$

where t=2×N×N and $p_i \in S$ denotes the output prediction of the current pixel i and $s_i \in \{0, 1\}$ the corresponding pixel label.

The segmentation loss may use any segmentation-based evaluation metric, or even multiple metrics predicted simultaneously. Different metrics that may be used may include DICE, Jaccard, true positive rate, true negative rate, modified Hausdorff, volumetric similarity, or others. DICE is a measure of the comparison between two different images or sets of values. The Jaccard index (JAC) between two sets is defined as the intersection between them divided by their union. True Positive Rate (TPR), also called Sensitivity and Recall, measures the portion of positive voxels in the ground truth that are also identified as positive by the segmentation being evaluated. Analogously, True Negative Rate (TNR), also called Specificity, measures the portion of negative voxels (background) in the ground truth segmentation that are also identified as negative by the segmentation being evaluated.

The last component of the loss function for the multi-task network 220 is a spatial loss value Lloc. Spatial labels from the annotated image may be compared against an output of the multi-task network 220. As an example, for certain abnormalities (e.g. nodule, mass, infiltrate, atelectasis, hilar, or others), there may be coarse location information available. The location loss is calculated using a weighted cross-entropy loss with location-specific classes. The spatial labels [b1, b2 . . . bF]∈{0, 1}, where F is the total number of spatial classes, are compared with the network action and the loss is calculated using the equations:

$$\mathcal{L}_{Loc}^{(m)}(I, b_m) = -(w_P^{(m)} * b_m \log(p_m) + w_N^{(m)} * (1 - b_m)\log(1 - p_m)),$$

$$\mathcal{L}_{Loc} = \sum_{n=1}^{F} \mathcal{L}_{Loc}^{(m)}(I, b_m),$$

where $$w_P^{(m)} = \frac{P_m + N_m}{P_m}$$

and $$w_N^{(m)} = \frac{P_m + N_m}{N_m},$$

and $N_m$ indicating, respectively, the number of presence and absence cases of spatial class m in the training set.

The individual localization loss LLoc may be activated/deactivated dynamically: If spatial labels are not available for abnormality n, all spatial labels are disregarded, and no gradients are computed. In an embodiment, the multi-task network 220 may use other representations of the spatial abnormality classifications, such as contours, or masks. In an embodiment, the multi-task network 220 may incorporate information from additional images (acquired in the same session or previously) as inputs and use the multi-task network 220 on any subset of images.

At act A150, internal parameters and weights of the multi-task network 220 are adjusted as a function of the comparison. Acts A130-A150 are repeated until the network converges or a set point is reached. At act A160, an optimized/trained multi-task network 220 is output. The trained multi-task network 220 is configured to input a normalized chest X-ray image and output a probability of different abnormalities present in the chest X-ray image: _o=p (I; θ), where _o∈[0, 1] D and D is the number of considered abnormalities. The multi-task network 220 is also configured to compute a probabilistic segmentation map S∈[0, 1]2×N×N for both lungs and the heart. The probability of different abnormalities is input into a confidence module 230 that generates an abnormality prediction and confidence value. The abnormality prediction and confidence value (and the segmented masks) may be output for display to an operator or stored for further analysis or diagnosis.

Figure 8:
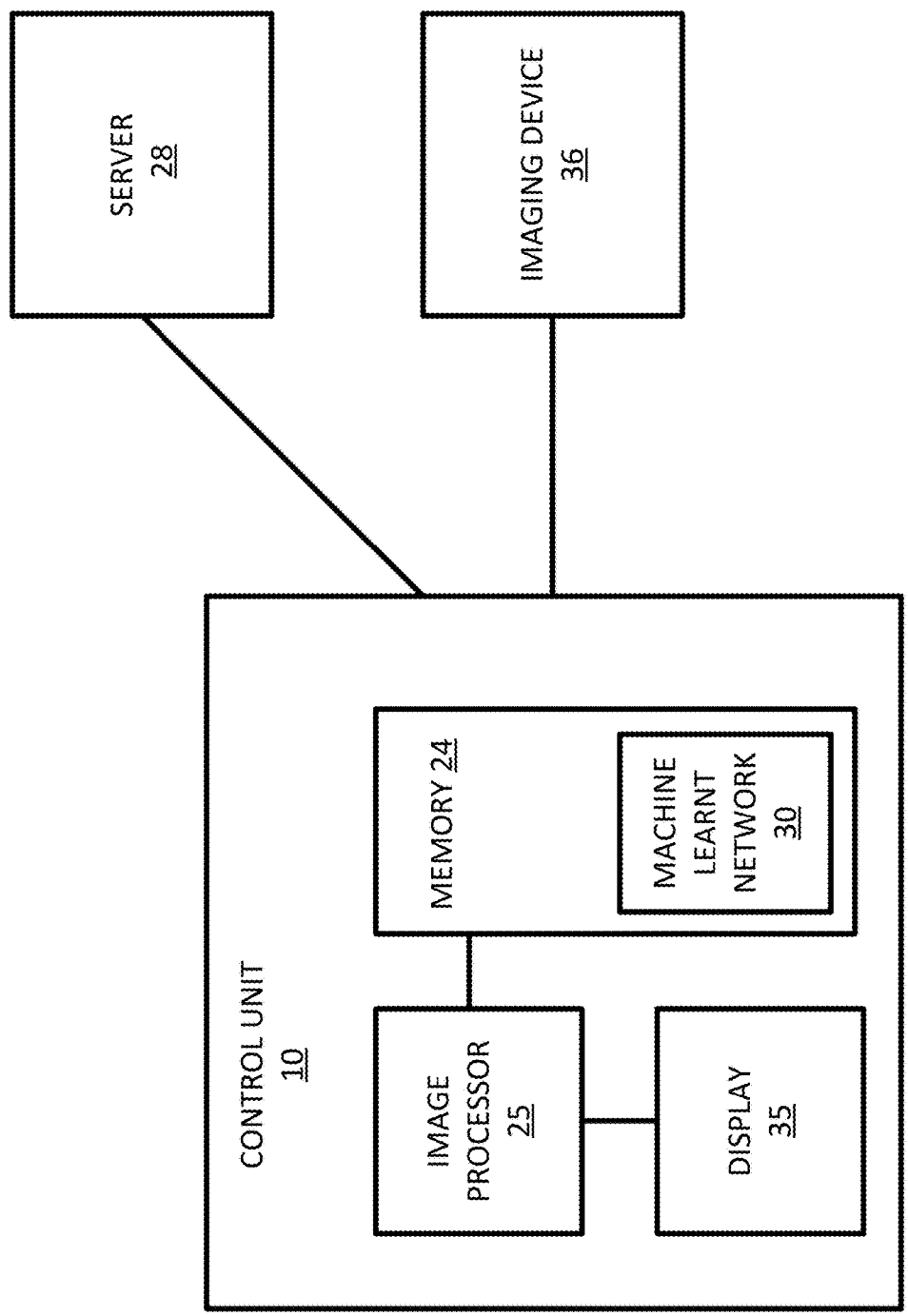
FIG. 8 depicts an example system for classifying abnormalities.

FIG. 8 depicts an embodiment of a control unit 10 for classifying abnormalities in medical imaging data. The control unit 10 includes an image processor 25, a memory 24, a graphical user interface 35, and a machine learnt network 30. The control unit 10 may also be in communication with a server 28, imaging device 36, or other components. Additional, different, or fewer components may be provided. For example, network connections or interfaces may be provided, such as for networking with a medical imaging network or data archival system. The imaging device 36 may be any medical imaging device, for example a chest X-ray imaging device. The imaging device 36 is configured to acquire medical imaging data of a patient or an object and store the acquired medical image data in the memory 24 or on the server 28.

The memory 24 may be a graphics processing memory, a video random access memory, a random-access memory, system memory, cache memory, hard drive, optical media, magnetic media, flash drive, buffer, database, combinations thereof, or other now known or later developed memory device for storing data or video information. The memory 24 is part of the control unit 10, server 28, imaging device 36, part of a computer associated with the image processor 25, part of a database, part of another system, a picture archival memory, or a standalone device.

The memory 24 stores medical imaging data, annotations for the medical imaging data, and instructions to implement the method and systems described herein. The memory 24 or other memory is alternatively or additionally a non-transitory computer readable storage medium storing data representing instructions executable by the programmed image processor 25 for classifying abnormalities in medical imaging data. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the instructions set, storage media, processor or processing strategy and may be performed by software, hardware, integrated circuits, firmware, micro code, and the like, operating alone, or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The memory 24 may store a machine learnt network 30. The machine learnt network 30 may be a multi-task network 220 trained to classify abnormalities given a normalized input image. The structure, parameters, and weights for the machine learnt network 30 may be stored in the memory 24.

The image processor 25 is a general processor, central processing unit, control processor, graphics processing unit, digital signal processor, three-dimensional rendering processor, image processor, application specific integrated circuit, field programmable gate array, digital circuit, analog circuit, combinations thereof, or other now known or later developed device for processing medical imaging data. The image processor 25 is a single device or multiple devices operating in serial, parallel, or separately. The image processor 25 may be a main processor of a computer, such as a laptop or desktop computer, or may be a processor for handling some tasks in a larger system, such as in the server 28. The image processor 25 configured by instructions, design, hardware, and/or software to perform the acts discussed herein.

The image processor 25 may be configured to normalized acquired or stored images. The image processor 25 may be further configured to acquire a chest X-ray image of a patient; normalize the chest X-ray image; input the normalized chest X-ray image into a machine learnt network optimized to identify abnormalities in chest X-ray images; receive, from the machine learnt network, one or more abnormality classification scores for the chest X-ray image; map each of the abnormality classification scores to a discrete classification of abnormalities; and output the discrete classifications of abnormalities to for example, a display 26.

The display 26 is a monitor, LCD, projector, plasma display, CRT, printer, or other now known or later developed devise for outputting visual information. The display 26 receives images, graphics, text, quantities, or other information from the image processor 22, memory 24, and/or server 28. The display 26 is configured to provide images and other data to an operator. The control unit 10 may also include a user interface (not shown). The user interface may include an input device such as one or more buttons, a keypad, a keyboard, a mouse, a stylus pen, a trackball, a rocker switch, a touch pad, a voice recognition circuit, or other device or component for inputting data. The user interface and the display 26 may be combined as a touch screen that may be capacitive or resistive.

The network is a local area, wide area, enterprise, another network, or combinations thereof. In one embodiment, the network is, at least in part, the Internet. Using TCP/IP communications, the network provides for communication between the image processor 25 and the server 28. Any format for communications may be used. In other embodiments, dedicated or direct communication is used.

The server 28 is a processor or group of processors. More than one server 28 may be provided. The server 28 is configured by hardware and/or software. The server 28 may include one or more image processors 25. The one or more image processors 25 may operate serially or in parallel to process and render image data.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A system for multi-abnormality classification based on chest X-ray images, the system comprising:
   an imaging database configured to store a chest X-ray image;
   a normalization module configured to process the chest X-ray image to remove image characteristic variability due to acquisition factors;
   a multi-task network configured to receive the chest X-ray image and output abnormality classification scores for a plurality of abnormalities, wherein the multi-task network comprises an encoder network and a decoder network, wherein the encoder network comprises a plurality of layers of densely connected blocks followed by a global average pooling layer to predict the abnormality classification scores for the chest X-ray image;
   a confidence module configured to map each of the abnormality classification scores to a discrete classification as a function of a learned score threshold and a discrete confidence category; and
   an interface configured to output the discrete classifications.

2. The system of claim 1, further comprising:
   an imaging system configured to acquire the chest X-ray image.

3. The system of claim 1, wherein the normalization module is configured to adjust brightness and contrast via a linear transformation of image intensities of the chest X-ray image.

4. The system of claim 1, wherein the multi-task network outputs abnormality classification scores of abnormalities including at least two of granuloma, infiltrate, nodule, scarring, effusion, atelectasis, bone or soft tissue lesion, fibrosis, cardiac abnormality, mass, pneumothorax, COPD, consolidation, pleural thickening, cardiomegaly, emphysema, edema, pneumonia, hilar abnormality, or hernias.

5. The system of claim 1, wherein the decoder network comprises up-sampling, convolutional, and nonlinear layers and is configured to generate predicted segmented masks of anatomical structures for the chest X-ray image.

6. The system of claim 1, wherein a global loss value used for optimizing internal parameters of the multi-task network is calculated as a combination of an abnormality classification loss value, a segmentation loss value, and a spatial location loss value.

7. The system of claim 1, wherein the learned score threshold is calculated as a function of a multi-user observer study to yield a 1:1 ratio of false positives and false negatives.

8. The system of claim 1, wherein the confidence module is configured to map the abnormality classification scores as a function of a multi-user observer study to span a range such that a ratio of correct to incorrect classifications for each abnormality reaches a prespecified value.

9. The system of claim 1, further comprising:
   an analysis module configured to recommend a procedure as a function of the discrete classification of abnormalities.

10. A method for training a multi-task network for classification of different abnormalities, classification of locations of the different abnormalities, and segmentation of lung lobes and heart, the method comprising:
   acquiring training data comprising a plurality of chest X-ray images and annotations;
   normalizing the chest X-ray images to remove image characteristic variability due to acquisition factors;
   inputting the normalized chest X-ray images into the multi-task network;
   outputting, by the multi-task network, abnormality classification scores and a segmented mask;

comparing the abnormality classification scores and the segmented mask against the annotations from the training data;
adjusting weights in the multi-task network as a function of the comparison;
repeating inputting, outputting, comparing, and adjusting for a predetermined number of iterations; and
outputting a trained multi-task network.

11. The method of claim 10, wherein normalizing comprises adjusting a brightness and contrast of the chest X-ray images via a linear transformation of image intensities of the chest X-ray images.

12. The method of claim 10, wherein the multi-task network comprises an encoder decoder network.

13. The method of claim 12, wherein the encoder network comprises a plurality of layers of densely connected blocks followed by a global average pooling layer to predict the abnormality classification scores for the chest X-ray image.

14. The method of claim 12, wherein the decoder network comprises up-sampling, convolutional, and nonlinear layers and is configured to generate predicted segmented masks of anatomical structures for the chest X-ray image.

15. The method of claim 10, wherein comparing comprises calculating a global loss value as a combination of an abnormality classification loss value and a segmentation loss value.

16. A non-transitory computer implemented storage medium, including machine-readable instructions stored therein, that when executed by at least one processor, cause the processor to:

acquire a chest X-ray image of a patient;
normalize the chest X-ray image;
input the normalized chest X-ray image into a multi-task machine learnt network optimized to identify abnormalities in chest X-ray images;
receive, from the multi-task machine learnt network, abnormality classification scores for the chest X-ray image;
map each of the abnormality classification scores to a discrete classification of abnormalities as a function of a multi-user observer study so that the discrete classification of abnormalities span a range such that a ratio of correct to incorrect classifications for each abnormality reaches a prespecified value; and
output the discrete classifications of abnormalities.

17. The non-transitory computer implemented storage medium of claim 16, further comprising machine-readable instructions that when executed by at least one processor, cause the processor to:
recommend a medical procedure as a function of the discrete classification of abnormalities.

18. The non-transitory computer implemented storage medium of claim 16, wherein the machine-readable instructions to normalize the chest X-ray image comprise instructions to adjust brightness and contrast via a linear transformation of image intensities of the chest X-ray image.

* * * * *